July 6, 1943. G. E. SCHMITKONS 2,323,570
PRODUCTION OF MOTOR FUELS
Filed Aug. 3, 1940
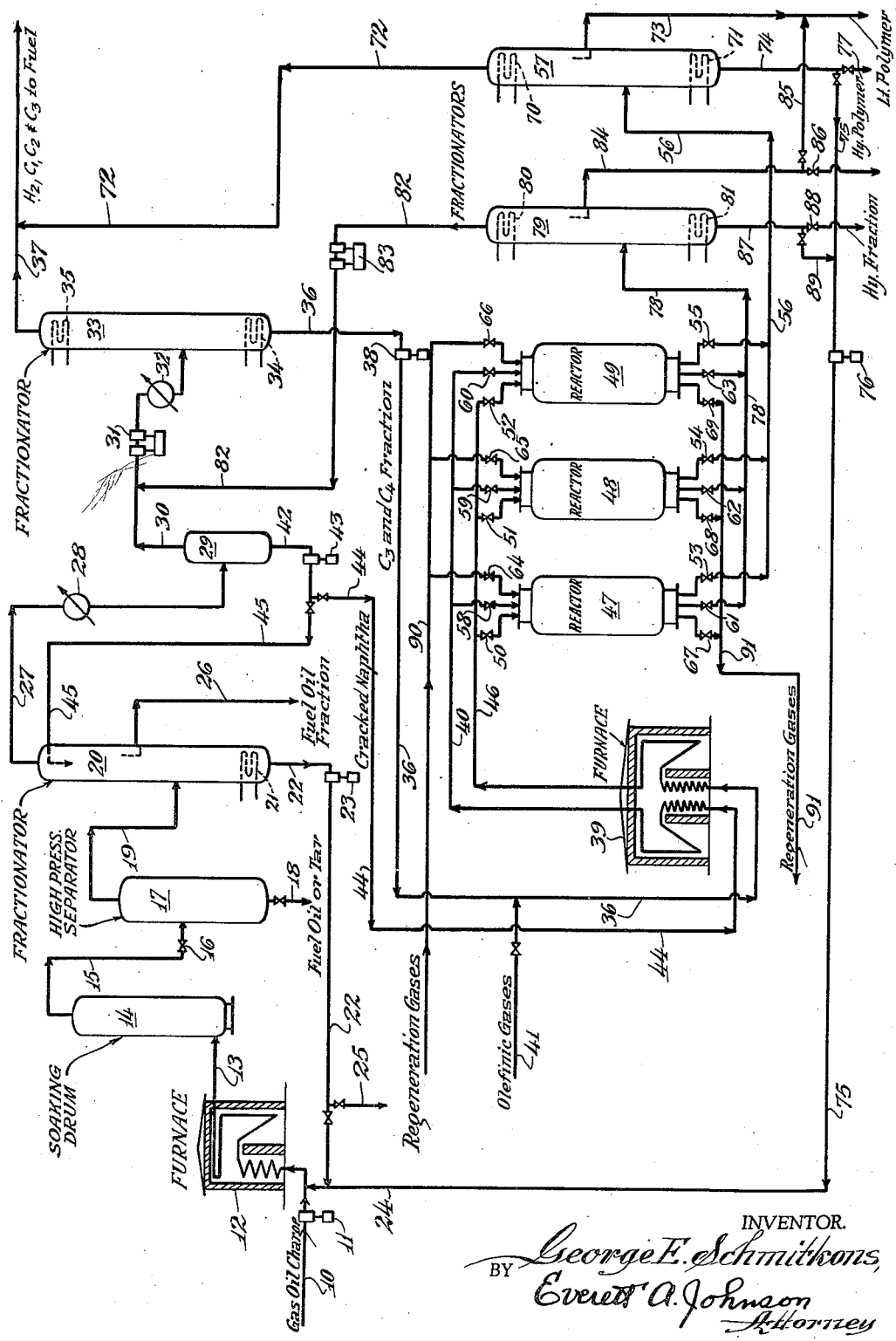
INVENTOR.
George E. Schmitkons,
BY Everett A. Johnson
Attorney Patented July 6, 1943

2,323,570

UNITED STATES PATENT OFFICE 2,323,570

PRODUCTION OF MOTOR FUELS

George E. Schmitkons, Chicago, Ill., assignor to Standard Oil Company, Chicago, Ill., a corporation of Indiana Application August 3, 1940, Serial No. 350,407

8 Claims. (Cl. 196—10)

This invention relates to a process for the production of motor fuel by the cracking of relatively heavy hydrocarbon oil, polymerizing the normally gaseous hydrocarbon fraction, and isomerizing the gasoline boiling range hydrocarbons. More particularly, this invention relates to a combination type of process involving these general types of operations.

My invention relates in general to the aforementioned type of combination process involving the interconnection of an oil cracking unit and a combination catalytic gas polymerization unit and catalytic isomerization unit. The oil cracking unit is adapted to convert relatively heavy hydrocarbon oil, such as gas oil, to cracked naphtha with normally gaseous hydrocarbons, having olefinic constituents, as a by-product. The catalytic gas polymerization unit polymerizes the gaseous hydrocarbons and the catalytic isomerization unit is adapted to isomerize or "isoform" the cracked naphtha and the like to produce high antiknock motor fuel.

Still more particularly the process relates to a combination operation wherein the catalytic polymerization and catalytic isomerization of olefin-containing naphthas are conducted in successive operations, with the same apparatus and catalyst.

Most isomerization catalysts have some polymerization activity and hence there is an undesirable loss to polymer during the initial period of the normal isomerization of olefin-containing naphthas. Further, in general, these catalysts lose their polymerization activity much more rapidly than their olefin isomerization activity. For example, chemically treated bentonite, one variety of which is known as Super Filtrol, is such a catalyst. This residual olefin isomerization activity of spent polymerization catalyst may be used to advantage.

It is an object of this invention to provide a process wherein the catalyst is used under polymerization conditions until spent or partially spent as a polymerization catalyst and then used as an olefin isomerization catalyst thereby improving the product distribution of the isomerization step. Hence, I propose a process in which any of the known catalysts having both isomerization and polymerization activity is used first for polymerization, such as the conversion of propylene and/or butylene, to motor fuel, until its activity as a polymerization catalyst has been substantially decreased and then for isomerization of olefins, such as in the vapor phase treatment of cracked naphtha for octane number improvement. After the catalyst has lost its activity for isomerization of olefins, it can be regenerated as described below, and used again for polymerization and the complete cycle of polymerization, isomerization and regeneration repeated for the life of the catalyst.

Therefore, it is an object of my invention to provide a process which utilizes the residual octane improving activity of a spent or partially spent polymerization catalyst before regeneration, eliminates the loss of the residual polymer gasoline entailed in polymerization regeneration cycles, and eliminates the initial high loss to high boiling polymer which would occur in the cracked naphtha reforming step if freshly regenerated catalyst were used. As the description of the invention proceeds, it will be apparent that these and other objects are attained by my invention.

In practicing my invention, the products of the oil cracking are separated into several fractions including one comprising predominantly normally gaseous hydrocarbons having olefinic constituents, and another comprising a cracked naphtha which may contain the major part of the $C_4$ hydrocarbons. The normally gaseous hydrocarbons may be further fractionated to eliminate hydrogen, methane, and ethane. The remaining gaseous hydrocarbons, consisting essentially of $C_3$ and $C_4$ hydrocarbons, both saturated and unsaturated, are passed to the catalytic polymerization along with $C_3$ and $C_4$ hydrocarbons from the isomerization step which enter the isomerization step with the feed to such step and/or are produced in the said isomerization step.

By effecting separation in the manner above described, a charging stock of $C_3$ and $C_4$ hydrocarbons containing unsaturated constituents from the oil cracking step is obtained for the catalytic polymerization cycle. In the catalytic polymerization cycle, the olefins are polymerized to higher boiling products, notably gasoline. The polymers from the catalytic polymerization cycle may be fractionated to recover the motor fuel and a paraffinic gas fraction which may be passed to a conversion unit to produce more olefins. Since butane is normally a constituent of gasoline, the products from the polymerization step may be fractionated to retain all or any desired part of the butane in the polymer product, only the lighter constituents of the paraffinic gas being converted to additional olefins for polymerization.

The cracked naphtha, or a part thereof, from the oil cracking operation is isomerized in a catalytic unit containing the partially spent polymerization catalyst. The catalyst bed is cleared of the residual polymers following the polymerization cycle by the cracked naphtha vapors led to the reactor for the isomerization cycle thus avoiding loss of the residual gasoline polymer.

The invention will be described in more detail with reference to the accompanying drawing which is a flow diagram illustrating the operation of the invention as applied to a system employing three reactors. It is to be understood, however, that my invention is not limited to such a system, but on the contrary, for reasons which will appear below, is of broader application and may be employed in connection with a combination process involving the use of additional reactors and a plurality of hydrocarbon streams.

Referring to the drawing, hydrocarbon oil such as clean gas oil is passed through line 10 by pump 11 to cracking heater 12. The cracking heater may be of well-known design and the oil in passing therethrough is heated to a temperature of from about 750° F. to about 1200° F. under pressure of from 200 to about 1000 pounds per square inch to effect the desired cracking of the charging stock into lower boiling hydrocarbons. Preferably the oil is cracked under short time conditions, for example, a few seconds, to obtain a gasoline of high antiknock value. Lower pressures are preferred when all of the naphtha is to be isomerized since low pressures increase the olefin content and it is desirable that this be high. The hot cracked product from the furnace or heater 12 can be passed by line 13 to reaction drum 14 to effect additional cracking and thus increase the yield of the cracked naphtha. The products from the reaction drum are withdrawn overhead and passed by transfer line 15 and valve 16 to a high pressure separator 17 which can be operated at pressures in excess of 300 pounds per square inch. Heavy fuel oil or tar is eliminated from the bottom of separator 17 via valved line 18. The lower boiling components of the product pass via line 19 to fractionator 20 which is provided with reboiler 21. The column 20 may be of the well-known bubble tower type provided with suitable fractionating plates or trays, and separation of the cracked products is effected therein. The insufficiently cracked gas oil is withdrawn from the bottom of the column 20 through a line 22 and recycled by pump 23 to line 24 which leads to furnace charge line 10 or it may be withdrawn by valved line 25 for processing elsewhere. A light fuel oil fraction may be withdrawn as a side stream from tower 20 via valved line 26.

The cracked naphtha having a distillation end point of about 400° F. to about 450° F. is separated in the fractionating column 20 and is withdrawn therefrom through line 27, together with the gaseous hydrocarbons produced in the cracking operation, as an overhead product. This product is partially condensed in condenser 28 and passes thence to reflux drum 29. A gaseous fraction is withdrawn from the reflux drum 29 to line 30 and compressor 31 and conducted to gas fractionator 33 through condenser 32. Fractionator 33 is provided with heating means 34 and means for producing reflux 35. Within the fractionator 33 a fraction containing mostly $C_3$ and $C_4$ hydrocarbons is recovered and withdrawn by line 36 and a fraction containing hydrogen, $C_1$ and $C_2$ hydrocarbons, is withdrawn overhead through line 37. The $C_3$ and $C_4$ fraction from gas fractionator 33 is passed by line 36 and pump 38 to furnace 39 and thence to header 46 of the catalytic unit as set out below. A part of the product in line 36 may be by-passed around furnace 39 to obtain better temperature control. Olefinic gases from an external source may be introduced to line 36 via valved line 41. Condensate in reflux drum 29 is passed in part via line 42 and pump 43 through valved line 44 to furnace 39 and in part to tower 20 as reflux via line 42 and valved line 45.

Cracked naphtha, which can be made to include a part or all of the $C_4$ hydrocarbons by adjusting conditions in drum 29, is passed through heater 39 and header 40 to the isomerization reactor which is on stream in the isomerization cycle. This reactor contains a solid granular catalyst, for instance a catalyst rich in alumina such as an activated bentonite, which has been spent with respect to its polymerization activity. Super Filtrol is one suitable catalyst. Various other catalysts likewise previously spent with respect to polymerization activity can be employed as will be described hereinafter.

In the operation of the polymerization cycle, assuming that reactor 47 is on stream for polymerization of olefins, valves 50 and 53 will be open and valves 51, 52, 54, 55, 58, 61, 64, and 67 are closed so that the $C_3$ and $C_4$ hydrocarbons passing through furnace 39 and entering header 46 will flow through reactor 47 and into header 56. The reactor 47 is provided with a catalytic material which has both isomerizing and polymerizing activity but which under the existing conditions, is a catalyst for polymerization of the $C_3$ and $C_4$ olefins. A temperature between about 250° F. and about 750° F. and a pressure between about 100 pounds per square inch and about 1000 pounds per square inch are satisfactory conditions for the polymerization.

The rate of the flow through reactor 47 is controlled to maintain the $C_3$ and $C_4$ gases in contact with the catalyst material for a length of time and under other conditions such as to effect the desired degree of polymerization of the $C_3$ and $C_4$ olefins. When using Super Filtrol pellets a temperature of about 600° F. and a pressure of about 200 pounds per square inch are satisfactory. When operating on only a $C_4$ fraction the conditions for polymerization may be, for example, 320° F. and 550 pounds per square inch or more. A mixture of polymers and unreacted gases is passed from reactor 47 via valve 53 and line 56 to fractionator 57 which is provided with means for producing reflux 70 and reboiler 71. The unreacted saturated gases containing $C_3$ and lighter hydrocarbons from the polymerization cycle pass from fractionator 57 via line 72 to the fuel burning line 37. Polymer of gasoline boiling range and unreacted $C_4$ hydrocarbons are withdrawn from fractionator 57 via line 73. High boiling polymer is withdrawn via line 74. It can be recycled via line 75, pump 76 and line 24 to line 10 or it can be withdrawn via valved line 77 for other disposition.

In the operation of the isomerization cycle, assuming that reactor 48 is on stream, valve 59 and valve 62 will be open and valves 51, 54, 58, 60, 61, 63, 65, and 68 are closed so that the cracked naphtha from furnace 39 passes through header 40 and enters reactor 48. The reactor 48 is provided with a catalytic material initially having both polymerization and isomerization activity but the polymerization activity has been substantially diminished resulting in an isomerization catalyst having reduced polymerization effect.

When Super Filtrol is the catalyst, the temperature employed in isomerization may be from about 600° F. to about 1100° F., for example 925° F., and the pressure used generally will be between about atmospheric and about 200 pounds per square inch, for example about 50 pounds per square inch gage. Similar temperatures and pressures can be used with other catalysts although the optima will vary somewhat in each case. The rate of the flow through reaction chamber 48 is controlled to maintain the vapors of the cracked naphtha in contact with the catalytic bodies for a length of time sufficient to effect the desired isomerization of the cracked naphtha. The rate of contacting the naphtha with the catalyst usually will be about 0.1 to about 100 volumes of naphtha (measured as cold liquid) per gross volume of catalyst per hour. The rate should be higher with more active catalyst and at the higher temperatures and/or higher pressures.

The product from the isomerization cycle is predominantly naphtha of the same boiling range as charged but contains minor proportions of lighter and heavier material. Hence this product is passed via header 78 to a fractionating column 79 which is equipped with means for producing reflux 80, and heating means 81. In fractionator 79 there is separated from the product a gaseous overhead product containing hydrogen, $C_4$ hydrocarbons, and hydrocarbons of less than four carbon atoms. This overhead stream is directed to line 30 via line 82 and compressor 83. $C_4$ and $C_3$ hydrocarbons are separated from this stream in fractionator 33 and are sent therefrom to the polymerization cycle. By means of line 84 a side stream of isomate of gasoline end point is withdrawn and either passed through line 85 to be blended with polymer in line 73 or removed through valve 86 for blending with other high octane number naphthas to make gasoline. A heavy fraction of boiling range above the distillation range of gasoline is withdrawn from fractionator 79 by line 87. This fraction can be eliminated through valve 88 in line 87 or it may be combined wholly or in part with the heavy product from fractionator 57 and recycled via lines 89 and 75, pump 76 and line 24 to thermal cracking charge line 10.

After the isomerization activity of the catalytic material in reactor 48 has been substantially reduced, the flow of the cracked naphtha vapors from line 40 may be transferred to reactor 47 which has previously been used for the polymerization of $C_3$ and $C_4$ hydrocarbons. This is effected by opening valves 58 and 61, and closing valves 50, 53, 59, and 62. Thereafter isomerization continues in chamber 47 as described above in connection with reactor 48. This procedure eliminates the loss of the residual polymer gasoline.

After the catalytic unit has gone through a cycle of polymerization and isomerization it is found that the catalyst in the unit has lost both its polymerization and isomerization activity to an undesirable extent, and regeneration becomes necessary to remove catalyst-masking carbonaceous deposits. Regeneration can be accomplished after diverting the hydrocarbon stream from the chamber. For example, if chamber 49 contains the spent catalyst material, valves 66 and 69 will be opened, valves 64, 65, 67, 68, 62, 60, 55 and 63 being closed. The catalyst chamber 49 is then swept out with an inert gas, for example flue gas, steam or nitrogen which is introduced from header 90 and discharged by valve 69 into header 91. After the hydrocarbon vapors have been swept from the catalyst bed, the regeneration gas is introduced through header 90 and valve 66. An oxidizing gas, such as air or a mixture of air and inert gas, can be used to regenerate the catalyst. After regeneration the catalyst bed is again swept with an inert gas to remove oxygen.

After the catalyst has been regenerated the $C_3$ and $C_4$ stream is diverted from the recent polymerization zone into the chamber containing freshly regenerated catalyst, the cracked naphtha stream is diverted from the recent isomerization chamber to the chamber containing the partially spent polymerization catalyst, and the spent catalyst in the recent isomerization chamber is regenerated as outlined above.

The catalysts which can be employed in my process are predominantly active clays and compositions containing silica and/or alumina generally. As indicated above, Super Filtrol is an example of a catalyst particularly useful in my process.

Where silica is used, it may be in the form of some acid treated natural silicate. Naturally occurring clay, such as fuller's earth, Attapulgus clay, bentonite, and other catalytically active clays in general may be used either in the acid treated or untreated form.

I have found that synthetic porous aluminosilicate adsorbent catalyst can be prepared which is not only decidedly superior in catalytic isomerization of cracked naphthas of the above described type but is also an excellent polymerization catalyst. The catalyst is prepared by the interaction of a dilute solution of sodium silicate and a dilute sodium aluminate solution. The alumino-silicate contains exchangeable zeolitic sodium ion which can and should be removed by very weak acid or replaced by aluminum or ammonium ion. This exchange is effected by repeatedly washing the gel with an aqueous solution of aluminum or ammonium salt and washing away excess solution with water. The purified gel is heated to dryness, calcined at temperatures below about 1200° F. and ground to suitable size, i. e. 8 to 60 mesh.

Silica gel can be activated for use as a catalyst in my process by immersing the gel in solutions of the salts of various activating elements such as the salts of Al, Mg, and Be. That is, in general, I contemplate the use of catalysts which are known to have both polymerization and isomeration activity.

The flow diagram shows my process as applied to a fixed bed catalyst operation but so-called moving bed operations or powdered catalyst operations can be used wherein catalyst is passed through a reaction zone concomitantly with the stock. In such a system the catalyst can be regenerated externally in a separate zone by regulated oxidation with a suitable regenerating medium.

While I have described my combination process as one comprising the concomitant operation of a polymerization reactor, an isomerizing reactor and a reactor the catalyst in which is being regenerated, I do not wish to be limited to the use of only one zone for each of these operations since the on-stream time for the polymerization, isomerization and regeneration (including gas purging, etc.) cycles are not necessarily equal and hence the described reaction zones may be in multiple.

The term "naphtha" as used in this specification and in the appended claims refers to a naphtha distilling almost entirely below 450° F.

It is apparent that many widely different embodiments of this invention can be made without departing from the spirit and scope thereof, and therefore it is not intended to be limited except as indicated in the appended claims.

I claim:

1. A process of hydrocarbon conversion comprising passing a hydrocarbon material rich in olefin hydrocarbons and consisting at least predominantly of normally gaseous hydrocarbons over a catalyst having both olefin polymerizing and cracked naphtha isomerizing powers under conditions adapted to effect substantial polymerization of said olefin hydrocarbons for a period of time sufficient to reduce drastically the olefin polymerizing powers of said catalyst, and then passing a cracked naphtha containing a large amount of normally liquid olefin hydrocarbons over said catalyst under conditions adapted to isomerize a substantial amount of said last-mentioned olefin hydrocarbons and to raise markedly the octane number of said cracked naphtha.

2. A process according to claim 1 in which said catalyst contains a large amount of at least one catalytically active metal oxide selected from the group consisting of alumina and silica.

3. A process of hydrocarbon conversion comprising subjecting a stream of olefin hydrocarbons consisting at least predominantly of normally gaseous hydrocarbons to polymerization within a catalytic reaction zone in the presence of a catalyst having both olefin polymerizing and cracked naphtha isomerizing activity, maintaining said olefin hydrocarbons on stream for a time sufficient to spend substantially the olefin polymerizing activity of said catalyst, and thereafter subjecting a thermally cracked naphtha containing a large amount of normally liquid olefin hydrocarbons to isomerization within a catalytic reaction zone in the presence of said catalyst, whereby a substantial proportion of said last-mentioned olefin hydrocarbons is isomerized and the octane number of the thermally cracked naphtha markedly increased.

4. A process according to claim 3 in which said catalyst contains a large amount of at least one catalytically active metal oxide selected from the group consisting of alumina and silica.

5. The process of producing gasoline of high knock rating by the cracking of hydrocarbons, wherein are produced a plurality of fractions including a cracked naphtha, and a fraction containing $C_3$ and $C_4$ hydrocarbons, the steps which comprise separating the $C_3$ and $C_4$ hydrocarbon fraction from the products of said cracking operation, vaporizing said $C_3$ and $C_4$ hydrocarbons and producing a gasoline polymer therefrom by flowing a stream of the gases in contact with a polymerization catalyst until the polymerization activity thereof is materially reduced, and recovering the vapors of the polymer gasoline, separating as a second fraction from the products of said cracking operation a cracked naphtha boiling substantially within the gasoline boiling range, vaporizing the said naphtha and subjecting the vapors thereof to the action of an isomerization catalyst, comprising the catalyst formerly used in the aforementioned polymerization operation, at a temperature of between about 600° F. and about 1100° F. and under a pressure of from about atmospheric to about 200 pounds per square inch, with a contact time between about 0.1 and about 100 volumes of naphtha per gross volume of catalyst per hour, thereafter recovering the isomerized naphtha and fractionating the said gasoline polymer and the said isomerized naphtha to produce the desired gasoline.

6. In the production of high octane number motor fuels from a thermally cracked naphtha fraction and a normally gaseous olefinic fraction, the steps comprising subjecting the normally gaseous olefinic fraction to polymerization in the presence of a catalyst initially having both olefin polymerizing and thermally cracked naphtha isomerizing activity, contacting said catalyst with the normally gaseous olefinic fraction for a time sufficient to spend substantially the olefin polymerizing activity of said catalyst, and subjecting the naphtha fraction to isomerization in the presence of the said catalyst previously spent in the said polymerization, whereby a substantial proportion of normally liquid olefins in said thermally cracked naphtha is catalytically isomerized to produce an isomerized gasoline fraction of markedly increased octane number.

7. In the process according to claim 6 the further steps of recovering a polymer gasoline fraction and blending said polymer gasoline fraction and said isomerized gasoline fraction.

8. The process according to claim 6 wherein the catalyst initially having both olefin polymerizing and thermally cracked naphtha isomerizing activity contains at least one catalytically active metal oxide selected from the group consisting of alumina and silica.

GEORGE E. SCHMITKONS.